INVENTOR
JACK L. BAUMAN
ATTY

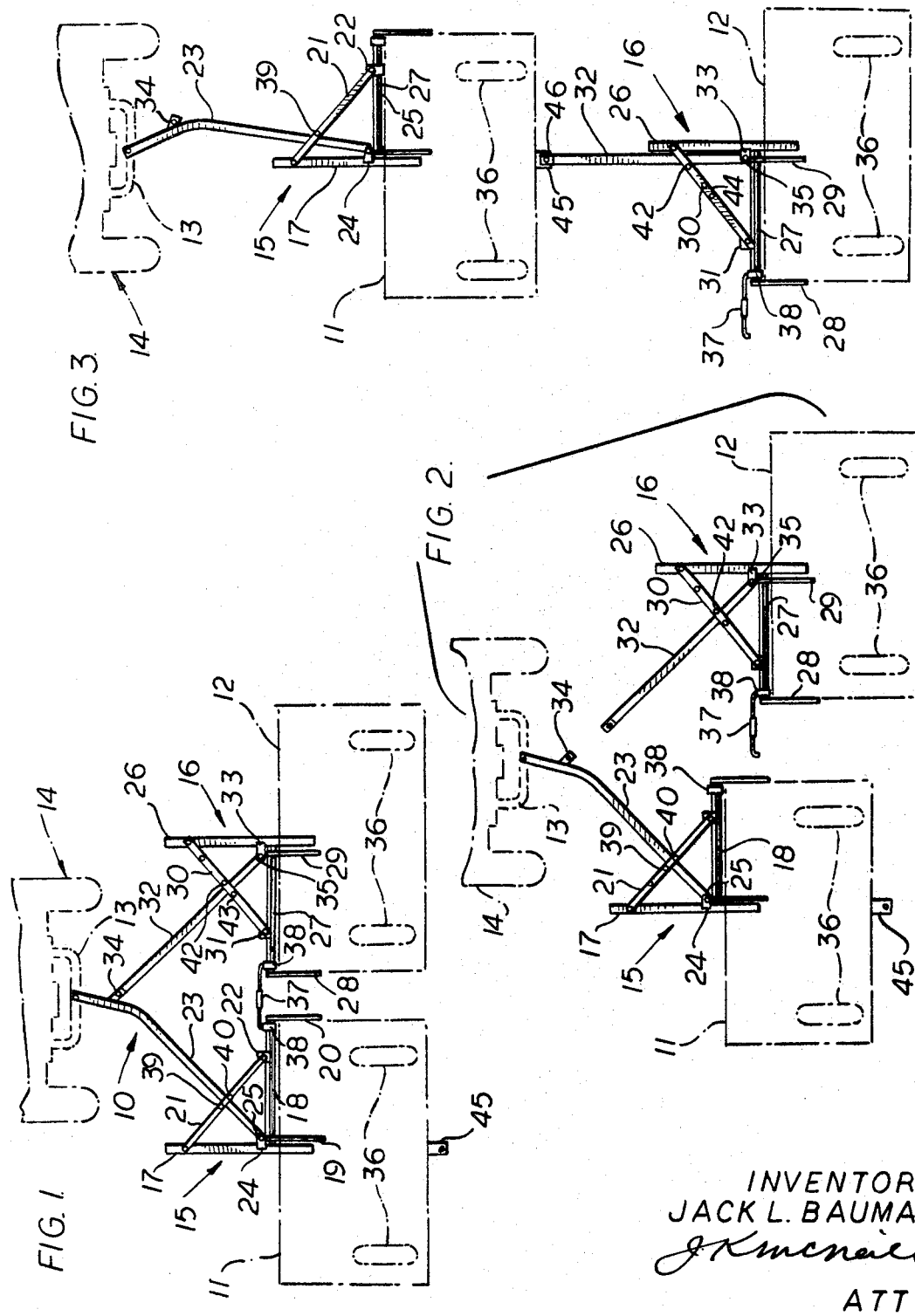

United States Patent Office 3,387,861
Patented June 11, 1968

3,387,861
IMPLEMENT DUPLEX HITCH
Jack L. Bauman, Naperville, Ill., assignor to International Harvester Company, Chicago, Ill., a corporation of Delaware
Filed Nov. 10, 1966, Ser. No. 593,473
6 Claims. (Cl. 280—412)

This invention relates to hitches for agricultural implements and particularly to hitch means for connecting multiple implement units to a tractor.

An object of the invention is to provide novel drawbar means for hitching a plurality of implement units in side-by-side relation behind a tractor, wherein the drawbar means for each unit is readily convertible for use in disposing one of said units in tandem relation behind another for transport purposes.

Another object of the invention is the provision of novel implement drawbar means for a multiple implement hitch wherein the draft means by which each implement is connectable to the tractor is swingable from a locked diagonal relationship to the line of travel to a position parallel to the line of travel to facilitate connecting the implement units in tandem relation for transport.

Other objects and advantages of the invention will become clear from the following detailed description when read in conjunction with the accompanying drawings, wherein:

FIGURE 1 is a diagrammatic plan view of a multiple or duplex hitch structure incorporating the features of this invention, for connecting a pair of implement units such as planters or cultivators in side-by-side relation behind a tractor;

FIGURE 2 is a diagrammatic plan view similar to FIGURE 1 showing one stage in the disconnection of one implement unit from the other preparatory to transporting the implement;

FIGURE 3 is a diagrammatic plan view of the structure shown in FIGURES 1 and 2 with the implements connected in tandem relation for transport.

Figure 4:
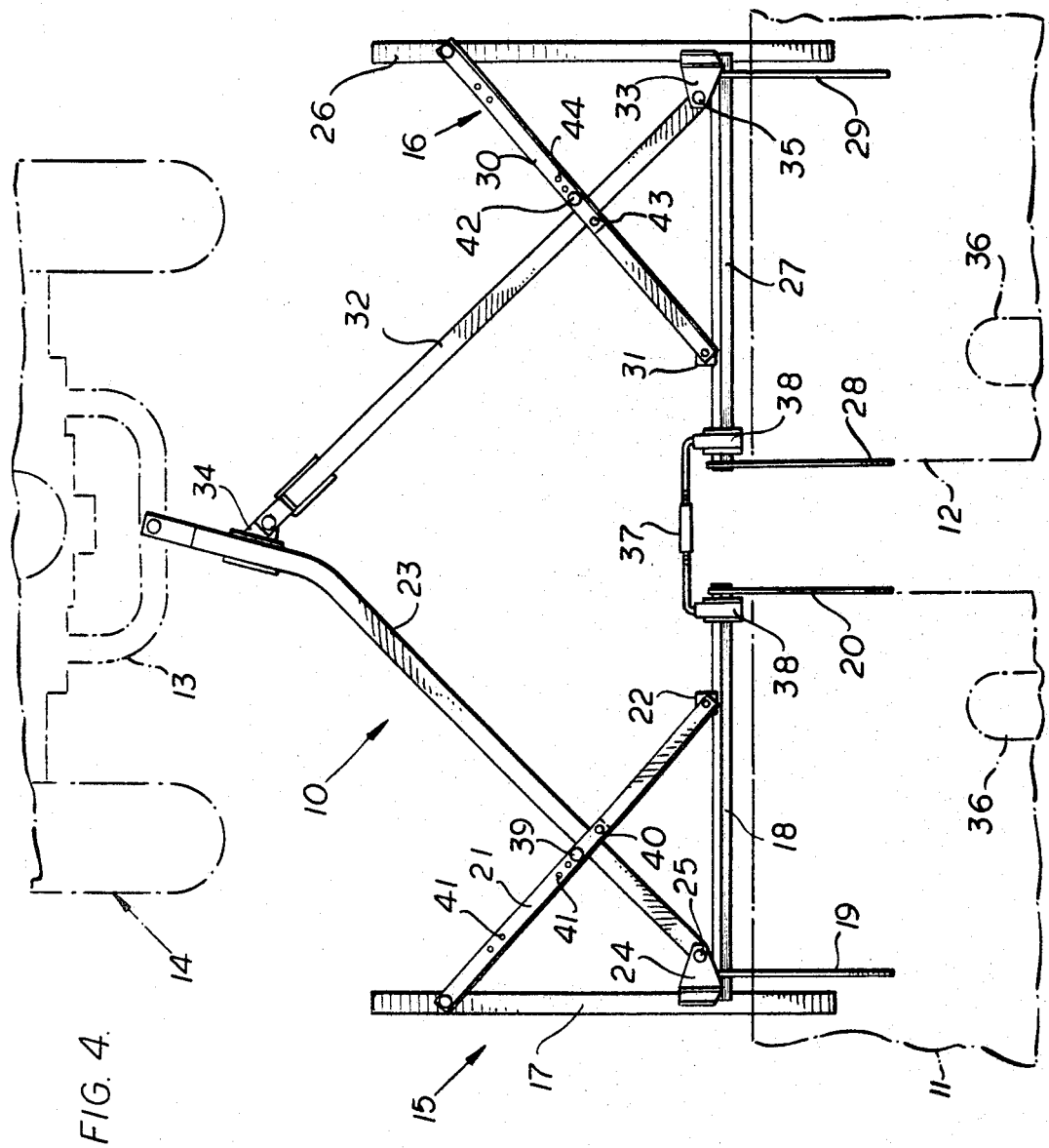
FIGURE 4 is an enlarged plan view of the implement drawbar or hitch structure shown in FIGURE 1.

In the drawings the numeral 10 designates a duplex hitch structure adapted for connecting a pair of separate implement units 11 and 12 to the hitch bar 13 of the tractor 14.

It may be understood that the implement units 11 and 12 are conventional in their general construction and have affixed thereto and extending forwardly therefrom drawbar means 15 and 16, respectively. Drawbar means 15 comprises a longitudinally extending member 17 affixed to and projecting forwardly from the frame of implement unit 11, a transversely extending bar 18 secured to member 17 and to frame elements 19 and 20, and a diagonal brace comprising vertically spaced links 21 pivotally connected at one end to a lug 22 affixed to a bar 18, and at its other end to the longitudinally extending drawbar member 17.

A draft bar 23 is pivotally connected at its rear end to a lug 24 secured to member 17 adjacent its juncture with the frame of implement unit 11 and in the operating position of the implement shown in FIGURES 1 and 4, draft bar 23 extends diagonally forwardly and is curved at its forward end for pivotal connection to tractor hitch bar 13. Draft bar 23 is disposed between links 21, only one of which is shown, the latter serving as a guide to slidably receive draft bar 23 when the latter is swung horizontally about the axis of pivot pin 25 carried by lug 24, for a purpose hereinafter to become clear.

In a manner similar to the drawbar means 15 of implement unit 11, the drawbar means 16 of unit 12 comprises a longitudinally extending member 26 affixed to and projecting forwardly perpendicular to the frame of unit 12. A transverse bar 27 is secured at one end to member 26 and is also affixed to frame elements 28 and 29.

A diagonal brace 30 comprising vertically spaced links, only one of which is shown, is connected at one end to member 26 and at its other end to a lug 31 secured to bar 27, the spaced links of brace 30 serving to slidably receive and guide a draft bar 32 pivotally connected at one end to a lug 33 secured to member 26 adjacent its juncture with implement unit 12, draft bar 32 extending diagonally forwardly in the operating position of the implement for pivotal connection to a lug 34 secured to the forward portion of draft bar 23 of lefthand unit 11, draft bar 32 being swingable horizontally about the axis of pivot pin 35 carried by lug 33.

The duplex implement shown in the drawings is pivotally connected in trailing relation to tractor 14, and each of the separate units 11 and 12 is supported upon ground-engaging wheels 36. Lateral spacing between the units 11 and 12 while accommodating independent vertical floating movement of the units 11 and 12 is accomplished by the provision of a transverse link in the form of a turnbuckle 37 to vary the length of the link, the ends of the turnbuckle being bent rearwardly for pivotal reception in sleeves 38 secured to the inner ends of bars 18 and 27.

In the operating position of the implement, draft bars 23 and 32 converge forwardly for connection in draft-receiving relation to the tractor and bar 23 is held in position with respect to brace 21 by the provision of pins 39 and 40 receivable in selected openings 41 in brace 21 and disposed on opposite sides of draft bar 23. Similarly, draft bar 32 is held in position by pins 42 and 43 likewise receivable in selected openings 44 in brace 30 and disposed on opposite sides of the draft bar.

FIGURE 2 shows the implement being prepared for transport, link 37 being disconnected from one of the sleeves 38 and draft bar 32 being disconnected from its connection to draft bar 23. Pin 39 is removed and the tractor operated to swing draft bar 23 about its pivot 25 to a location more closely adjacent and parallel to drawbar member 17, whereupon pin 39 is placed in one of the openings 41 nearer member 17 and disposed against one side of draft bar 23, as shown in FIGURE 3.

Similarly, pin 42 is removed and draft bar 32 swung to the position shown in FIGURE 3 parallel to bar 26, whereupon pin 42 is placed in one of the openings closer to drawbar member 26 and bearing against draft bar 32. The tractor is then driven to a position with draft bar 32 of unit 12 adjacent a hitch member 45 affixed to and extending rearwardly from the central portion of unit 11 and a pin 46 inserted in registering openings to permit unit 12 to follow directly behind unit 11 in tandem relation. Of course, reattachment of the implement in operating position is accomplished by merely reversing this procedure.

It is believed that the construction and operation of the novel duplex hitch mechanism of this invention will be clearly understood from the foregoing description. It should likewise be understood that the invention has been described in its preferred embodiment and that modifications may be made therein without departing from the spirit of the invention or the scope of the appended claims.

What is claimed is:

1. In a tractor drawn duplex implement having transversely spaced units, hitch means for connecting the implement to the tractor in draft-receiving relation for independent vertical movement of said units and for optionally shifting one unit to a tandem relation with the other unit to facilitate transporting the implement comprising, drawbar means extending forwardly from each of said units including an inwardly extending part, a draft member pivotally connected to each of said units and extending forwardly in sliding relation to the respective of said drawbar means for lateral swinging between positions in forwardly converging relation for pivotal connection to the tractor for operation of the implement and positions substantially parallel to the line of travel of said units, means for releasably locking said draft members to said drawbar means to prevent said lateral swinging in either of said positions, one of said draft members being disconnectable from the tractor for disposition of one said unit rearwardly of the other unit, and means for connecting the draft member of said one of said units to said other unit to be drawn therebehind.

2. The invention set forth in claim 1, wherein link means extends between the inner ends of said units and is pivotally connected thereto to maintain a transverse spacing therebetween while accommodating independent vertical movement of said units.

3. The invention set forth in claim 2, wherein each of said drawbar means includes a longitudinally extending member and each of said inwardly extending parts is a diagonal brace connected at one end to said longitudinally extending member and at the other end to the associated unit, said brace including vertically spaced elements confining and guiding the lateral swinging of said draft member.

4. The invention set forth in claim 3, wherein said means for releasably locking said draft members to said drawbars comprises openings formed in each of said diagonal braces and removable pin means receivable in said openings in locking relation to said draft members.

5. The invention set forth in claim 4, wherein said means for connecting the draft member of said one of said units to said other unit is a hitch bar mounted on and extending rearwardly from the central portion of said other unit.

6. The invention set forth in claim 5, wherein said draft member is pivotally connected to its associated unit adjacent the juncture of said longitudinally extending member and said unit.

References Cited

UNITED STATES PATENTS

| 2,357,761 | 9/1944 | Peacock | 280—412 |
| 2,709,085 | 5/1955 | Stueland | 280—412 |
| 3,064,996 | 11/1962 | Roppel | 280—412 |

FOREIGN PATENTS 148,178  12/1954  Sweden.

LEO FRIAGLIA, *Primary Examiner.*